United States Patent
Kamei et al.

(10) Patent No.: US 10,513,293 B2
(45) Date of Patent: Dec. 24, 2019

(54) FRONT VEHICLE-BODY STRUCTURE OF VEHICLE

(71) Applicant: MAZDA MOTOR CORPORATION, Hiroshima (JP)

(72) Inventors: Takehiro Kamei, Hiroshima (JP); Daisuke Sakagami, Hiroshima (JP); Shunsuke Hirai, Hiroshima (JP); Yasuhiko Nishida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 48 days.

(21) Appl. No.: 16/002,327

(22) Filed: Jun. 7, 2018

(65) Prior Publication Data

US 2019/0016389 A1 Jan. 17, 2019

(30) Foreign Application Priority Data

Jul. 14, 2017 (JP) .................................. 2017-137631

(51) Int. Cl.
*B62D 21/02* (2006.01)
*B62D 21/15* (2006.01)
*B60R 19/34* (2006.01)
*B62D 21/09* (2006.01)

(52) U.S. Cl.
CPC ............ *B62D 21/152* (2013.01); *B60R 19/34* (2013.01); *B62D 21/02* (2013.01); *B62D 21/09* (2013.01)

(58) Field of Classification Search
CPC ...... B62D 21/152; B62D 21/02; B62D 21/04; B62D 21/09; B60R 19/34

USPC .............. 296/203.01–203.02, 187.09, 187.1, 296/193.09
See application file for complete search history.

(56) References Cited

U.S. PATENT DOCUMENTS

| | | | | |
|---|---|---|---|---|
| 8,393,673 B2* | 3/2013 | Terada | ................. | B62D 25/088 296/193.09 |
| 8,936,299 B2* | 1/2015 | Tanaka | ................... | B62D 25/20 296/187.09 |
| 8,985,651 B2* | 3/2015 | Honda | .................... | B60R 19/18 293/120 |
| 2010/0066124 A1* | 3/2010 | Terada | ................... | B60R 19/34 296/187.09 |

(Continued)

FOREIGN PATENT DOCUMENTS

| | | | |
|---|---|---|---|
| JP | 2003-095135 A | 4/2003 | |
| JP | 2010-070133 A | 4/2010 | |

(Continued)

*Primary Examiner* — Dennis H Pedder
(74) *Attorney, Agent, or Firm* — Studebaker & Brackett PC

(57) ABSTRACT

There are provided a front side frame having a closed cross section extending in a vehicle longitudinal direction and including a mount-bracket attachment part for attaching a PT mount bracket provided at a PT mount for supporting a powertrain and a crash can attached to a front end of the front side frame. The front side frame includes a compressive-deformation part which is configured to be compressively deformed in a vehicle frontal collision and extend rearward from the front end, having substantially the same sectional shape as the crash can. A gusset member for preventing shearing deformation of the closed cross section of the front side frame is provided at a portion of the front side frame between the mount-bracket attachment part and the compressive-deformation part.

20 Claims, 11 Drawing Sheets

(56) References Cited

U.S. PATENT DOCUMENTS

| | | | |
|---|---|---|---|
| 2011/0095568 A1* | 4/2011 | Terada | B62D 25/088 |
| | | | 296/187.09 |
| 2013/0140852 A1 | 6/2013 | Takeda et al. | |
| 2014/0117685 A1* | 5/2014 | Honda | B60R 19/18 |
| | | | 293/120 |
| 2019/0031011 A1* | 1/2019 | Fujiaki | B60K 5/1208 |

FOREIGN PATENT DOCUMENTS

| | | |
|---|---|---|
| JP | 2013-193571 A | 9/2013 |
| JP | 2014-227153 A | 12/2014 |
| JP | 2016-113084 A | 6/2016 |

* cited by examiner

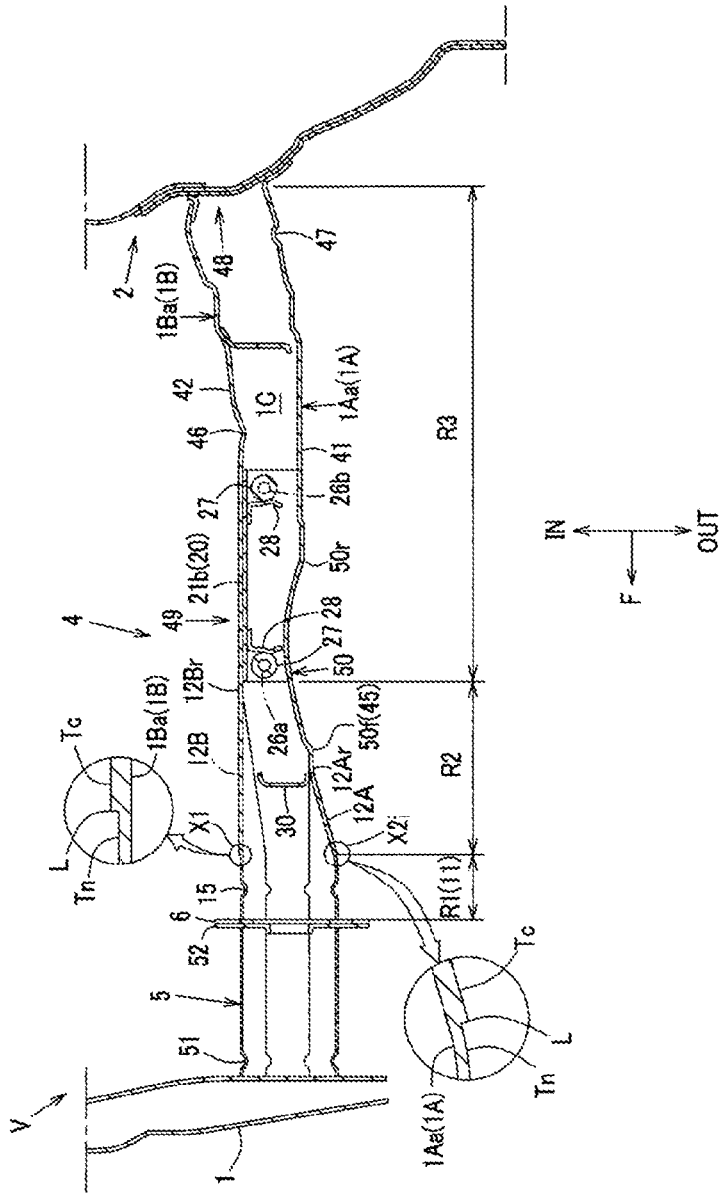

FRONT VEHICLE-BODY STRUCTURE OF VEHICLE

BACKGROUND OF THE INVENTION

The present invention relates to a front vehicle-body structure of a vehicle which comprises a front side frame having a closed cross section extending in a vehicle longitudinal direction and including a mount-bracket attachment part for attaching a mount bracket provided at a powertrain mount for supporting a powertrain and a crash can attached to a front end of the front side frame.

It is known that a gusset member as a reinforcing member is provided at a front side frame as exemplified in Japanese Patent Laid-Open Publication No. 2013-193571 and US Patent Application Publication No. 2013/0140852 A1. The above-described first patent document discloses a structure which comprises a front side frame (1), a lower member (3) which is arranged on an outward side, in a vehicle width direction, of this front side frame, and a gusset (2) which extends in a vehicle longitudinal direction from a front end of the front side frame (1) to a first breaking point (P1) between the front side frame (1) and the lower member (3), whereby a collision load can be securely transmitted to the front side frame (1) via the lower member (3) and the gusset (2) in a vehicle offset collision.

Further, a bulkhead (13) as the gusset member for receiving and supporting the collision load transmitted from the gusset (2) in the vehicle offset collision is provided inside the front side frame (1).

The above-described second patent document discloses a structure in which a front side frame (11) is provided with connection portions (18) (19) for supporting engine mounts (30) at front-and-rear points so as to reduce engine vibrations transmitted to a cabin side via the engine mounts (30), and at these connection portions (18) (19) are provided partitioning walls (82) (92) as a gusset member so as to improve support strength of the engine mounts (30).

Herein, it is known that a crash can is compressively deformed or a front side frame is broken and deformed at a specified breaking point in a vehicle frontal collision.

The present inventors have found that since a front-side portion of the front side frame can be made to perform the load absorption function aggressively by compressively deforming this front side portion, thereby effectively improving the load absorption performance of the front side frame in the vehicle frontal collision.

However, in a case where the front-side portion of the front side frame is configured to have low strength in order to compressively deform this portion in the vehicle frontal collision, the front-side portion of the front side frame tends to be easily deformed such that its cross section perpendicular to the vehicle longitudinal direction is crushed when a gear noise (engine noise) transmitted from the powertrain to a vehicle-body side via the powertrain mount (engine mount) is transmitted to this front-side portion. Consequently, there is a concern that the vibration is so amplified and transmitted to the cabin side that a vehicle passenger may have uncomfortable feelings, thereby deteriorating the NVH performance improperly.

The front side frame of the above-described first patent document is configured such that plural breaking points (P1-P3) are formed so as to break and deform this frame when receiving the frontal-collision load in the vehicle longitudinal direction and a bulkhead (13) is arranged inside this frame so as not to block this frame's breaking at the above-described breaking points. Further, the front-side portion of the front side frame is configured to have high strength by providing the gusset (2) at an outward-side face of this front-side portion along the vehicle longitudinal direction as described above.

However, the above-described first patent document has no description about a deformation mode based on the above-described concept that the front-side portion of the front side frame is made to perform the impact-load absorption function aggressively by compressively deforming the front side portion or about a structure in which the compressive deformation of the front-side portion of the front side frame in the vehicle frontal collision is not blocked by configuring this front-side portion to have the low strength. Thus, there is room for improvement of the load absorption performance of the front side frame.

Meanwhile, the above-described second patent document discloses the structure in which the partitioning walls (82) (92) are provided at the support position of the engine mounts (30), but not disclose any structure for increasing the strength of the front-side portion of the front side frame which is positioned in front of the engine mounts (30) by providing a partitioning wall at this front-side portion, for example. Thus, there is room for investigation of the above-described concern that the gear noise is transmitted to the low-strength front-side portion of the front side frame via the engine mount and thereby so amplified that the NVH performance may be deteriorated.

That is, while both of the front side frames disclosed in the above-described patent documents comprise the gusset member as the reinforcing member, the load absorption performance in the vehicle frontal collision and the NVH performance cannot be compatibly achieved properly by these disclosed front side frames.

SUMMARY OF THE INVENTION

Accordingly, an object of the present invention is to provide a front vehicle-body structure of a vehicle which can properly improve the load absorption performance, without blocking the proper deformation of the front side frame in the vehicle frontal collision and also improve the NVH performance by reducing the gear noise or the engine noise transmitted from the powertrain to the front side frame via the powertrain mount.

The present invention is a front vehicle-body structure of a vehicle which comprises a front side frame having a closed cross section extending in a vehicle longitudinal direction and including a mount-bracket attachment part for attaching a mount bracket provided at a powertrain mount for supporting a powertrain, and a crash can attached to a front end of the front side frame, wherein the front side frame includes a compressive-deformation part which is configured to be compressively deformed in a vehicle frontal collision and extend rearward from the front end thereof, having substantially the same sectional shape as the crash can, and a reinforcing member for preventing shearing deformation of the closed cross section of the front side frame is provided at a portion of the front side frame between the mount-bracket attachment part and the compressive-deformation part.

According to the present invention, sectional deformation of the front side frame's cross section perpendicular to the vehicle longitudinal direction which is caused by the gear noise generated by a transmission which is transmitted via the powertrain mount bracket to a portion of the front side frame which is located between the mount-bracket attachment part and a set plate can be suppressed by the reinforcing member, that is, vibration amplification is so suppressed that the vibration transmitted rearward (to a cabin) can be reduced, thereby improving the NVH performance properly. Further, since the reinforcing member is positioned in back of the compressive-deformation part of the front side frame which is configured to be compressively deformed in the vehicle frontal collision, the NVH performance and the load absorption performance in the vehicle collision can be compatibly achieved, without blocking the proper deformation of the front side frame.

In an embodiment of the present invention, a bending-deformation causing portion which causes bending deformation, in a vehicle width direction, of the front side frame when receiving a frontal-collision load is provided at a portion of the front side frame between the reinforcing member and the mount-bracket attachment part.

According to this embodiment, since the bending-deformation causing portion is provided at the portion of the front side frame between the reinforcing member and the mount-bracket attachment part, the proper bending deformation of the front side frame which is caused by the bending-deformation causing portion in the vehicle frontal collision is not so blocked by the reinforcing member and the mount-bracket attachment part that the NVH performance and the load absorption performance can be compatibly achieved.

In another embodiment of the present invention, a compressive-deformation causing portion which causes rearward compressive deformation of the compressive-deformation part of the front side frame is provided at the compressive-deformation part.

According to this embodiment, since the compressive-deformation causing portion is provided at the compressive-deformation part, the compressive-deformation part is so securely compressively deformed in the vehicle frontal collision that the load absorption performance can be improved in cooperation with the crash can, particularly in an initial stage of the collision.

In another embodiment of the present invention, each of the crash can and the compressive-deformation part of the front side frame has a roughly cross-shaped cross section perpendicular to the vehicle longitudinal direction.

According to this embodiment, since each cross section perpendicular to the vehicle longitudinal direction of the crash can and the compressive-deformation part of the front side frame is of a roughly cross shape, the section modulus of these members can be increased both in a vertical direction and in the vehicle width direction. Accordingly, even in a case where a frontal-collision load is inputted from a position which is offset vertically or laterally from the front side frame extending in the vehicle longitudinal direction and the crash can, the crash can and the compressive-deformation part can be properly prevented from being deformed in a falling manner (i.e., from being bent) because of blocking of convex portions protruding vertically and laterally which are formed at each roughly cross-shaped cross section thereof. Consequently, the compressive deformation of each of the crash can and the compressive-deformation part of the front side frame is so securely attained that the collision load can be properly absorbed.

In another embodiment of the present invention, the front side frame further includes an intermediate part which is positioned in back of the compressive-deformation part and configured such that a shape of a cross section thereof perpendicular to the vehicle longitudinal direction changes from a roughly cross shape to a roughly rectangular shape as going rearward and a rear part which is positioned in back of the intermediate part and configured such that a shape of a cross section thereof perpendicular to the vehicle longitudinal direction is a roughly rectangular shape.

According to this embodiment, since the intermediate part of the front side frame interconnects the compressive-deformation part having the roughly cross-shaped cross section and the rear part having the roughly rectangular-shaped cross section in the vehicle longitudinal direction such that the shape of the intermediate part's cross section gradually changes in the vehicle longitudinal direction, the frontal-collision load can be smoothly transmitted from the compressive-deformation part to the rear part of the front side frame by way of this intermediate part.

In another embodiment of the present invention, the front side frame comprises an outer panel and an inner panel which forms the closed cross section together with the outer panel, the reinforcing member is provided with a joint flange portion to be joined to the front side frame, and a joint portion of the inner panel and the outer panel is integrally joined to the joint flange portion of the reinforcing member such that the joint flange portion is disposed between the inner panel and the outer panel.

According to this embodiment, since the above-described both panels of the front side frame can be joined by the joint flange portion of the reinforcing member such that the both panels are connected, even in a case where a shearing force is inputted to the front side frame via the powertrain mount bracket, which is caused by the gear noise being transmitted to the front-side portion of the front side frame which is positioned in front of the mount-bracket attachment part, the sectional deformation (sectional collapse) of the front side frame can be suppressed.

In another embodiment of the present invention, the inner panel of the front side frame is configured to have a hat-shaped open cross section opened outward, in a vehicle width direction, and the outer panel of the front side frame is configured in a plate shape such that the open cross section of the inner panel is closed with the outer panel, the reinforcing member comprises a body portion, an outer-side joint flange portion which is joined to an outward-side face portion, in the vehicle width direction, of the outer panel from a side of the closed cross section, and an inner-side joint flange portion which is joined to an inward-side face portion, in the vehicle width direction, of the inner panel from the side of the closed cross section, the outer-side joint flange portion and the inner-side joint flange portion are configured to protrude in the same direction, in the vehicle longitudinal direction, relative to the body portion, and the inner-side joint flange portion is provided to be offset, in the vehicle longitudinal direction, from the outer-side joint flange portion in a vehicle side view.

According to this embodiment, when the inner-side joint flange portion is joined to the inner panel, its proper welding is not blocked by the outer-side joint flange portion, so that the welding work can be securely conducted.

In another embodiment of the present invention, a mount-reinforcing member is provided at the mount-bracket attachment part of the front side frame so as to reinforce the mount-bracket attachment part.

According to this embodiment, the rigidity of the mount-bracket attaching part of the front side frame can be increased by the mount-reinforcing member provided at the mount-bracket attachment part, so that the NVH performance can be improved by reducing the gear noise or the engine noise transmitted from the powertrain to the front side frame via the powertrain mount.

Further, since the mount-reinforcing member is provided at the mount-bracket attachment part, a portion of the front side frame which corresponds to the mount-bracket attachment part can be prevented from being bent and deformed in the vehicle frontal collision.

Other features, aspects, and advantages of the present invention will become apparent from the following description which refers to the accompanying drawings.

BRIEF DESCRIPTION OF THE DRAWINGS

FIG. 8 is a sectional view taken along line C-C of FIG. 2, which is shown by partially enlarging an X1 portion and an X2 portion.

DETAILED DESCRIPTION OF THE INVENTION

Figure 1:
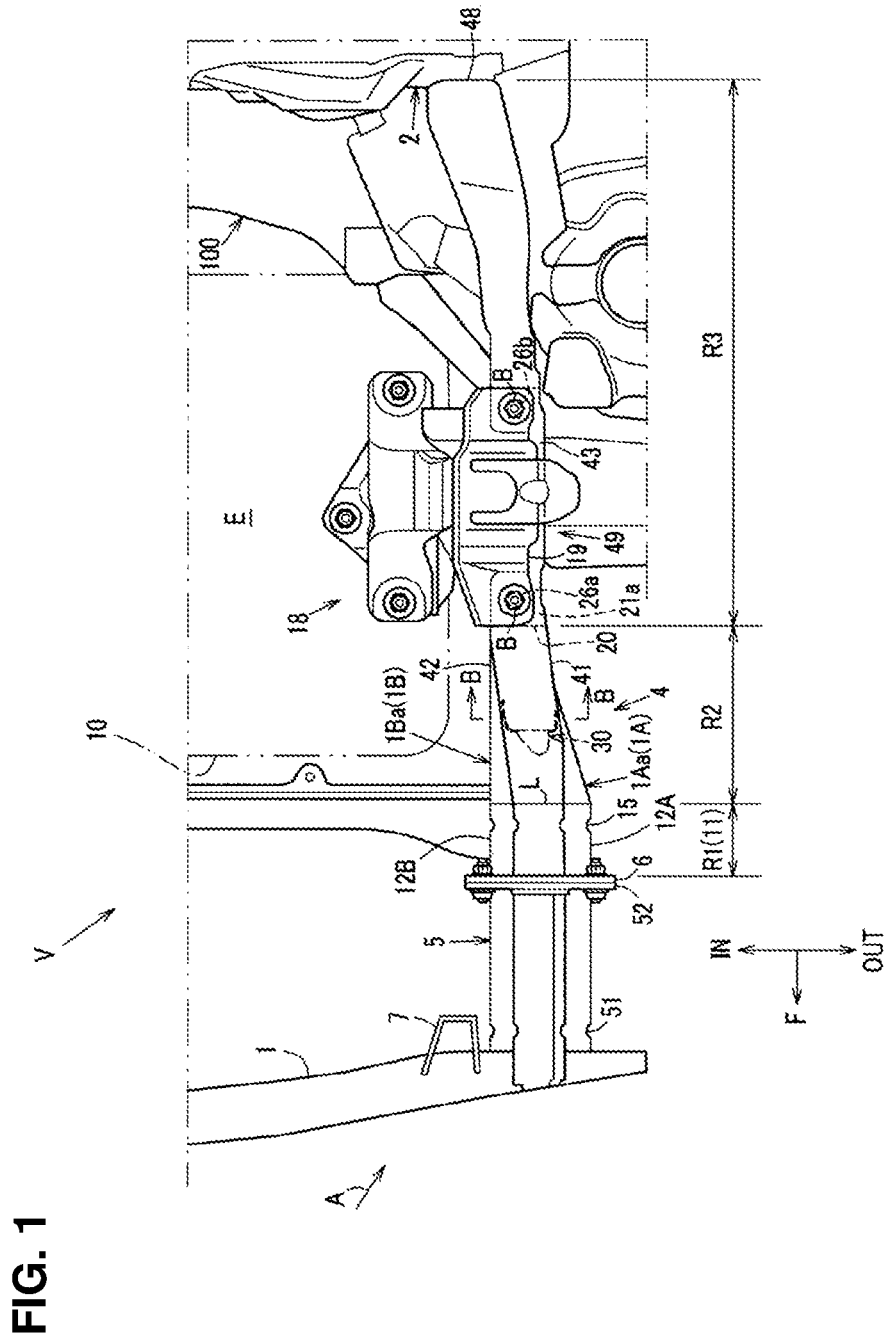
FIG. 1 is a plan view showing a main part of a front vehicle-body structure of a vehicle of the present embodiment.

Hereafter, an embodiment of the present invention will be described specifically referring to the drawings. In the figures, an arrow F shows a vehicle forward side, an arrow OUT shows an outward side (left side), in a vehicle width direction, of a vehicle, and an arrow IN shows an inward side (right side), in the vehicle width direction, of the vehicle, and an arrow U shows a vehicle upward side.

Since a front vehicle-body structure V of the vehicle of the present embodiment is substantially symmetrical laterally, a left-side structure of the vehicle will be described basically here.

As shown in FIGS. 1-4, the front vehicle-body structure of the vehicle comprises a bumper beam 1 which is provided at its front end portion and extends in the vehicle width direction, a dash panel 2 which is a wall to partition a cabin C (see FIGS. 2 and 3) from an engine room E, a pair of right-and-left front side frames 4 (the left one is illustrated only) which extend forward from a lower side of the dash panel 2 by way of kick-up portions 3 (see FIGS. 2-4), and a pair of right-and-left crash cans 5 (the left one is illustrated only) which are interposed between right-and-left end portions of the bumper beam 1 and the front side frames 4.

Figure 5:
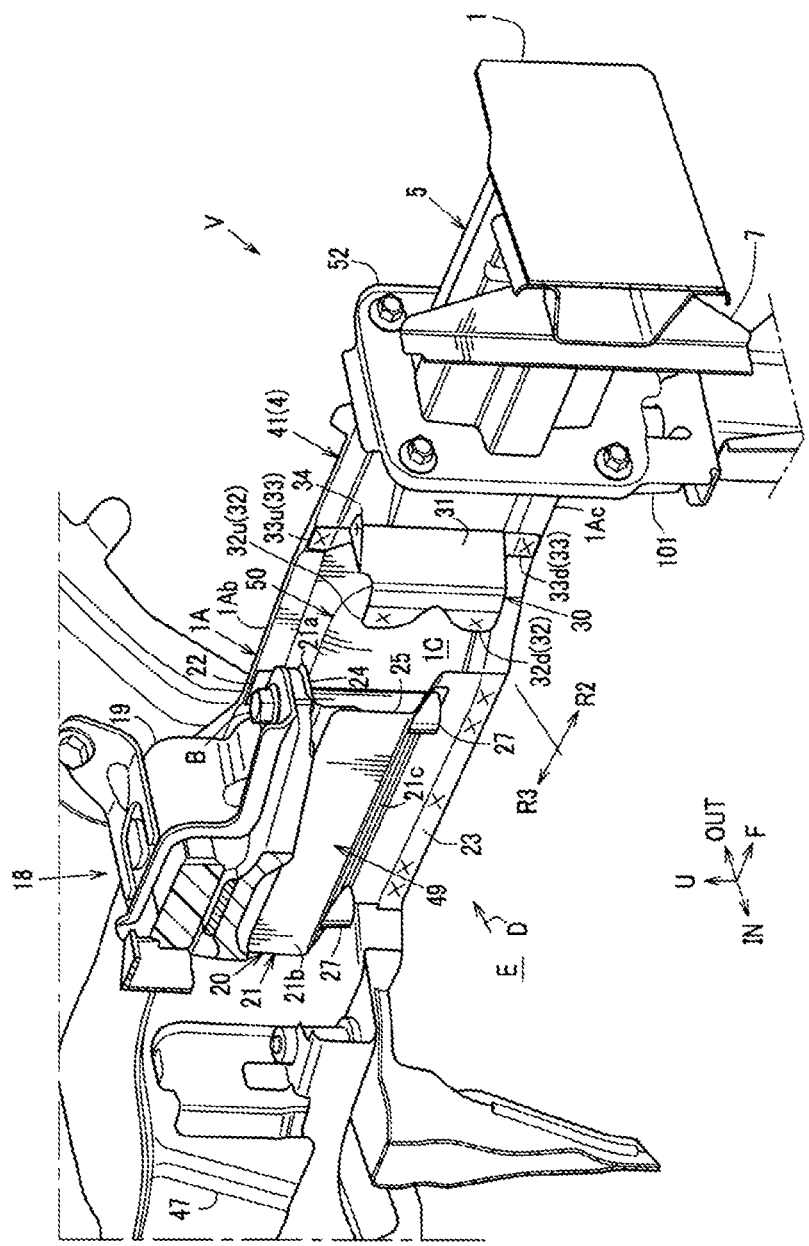
FIG. 5 is a perspective sectional view of the main part of the front vehicle-body structure of the vehicle in a state where the inner panel of the front side frame is removed, when viewed from a forward side of the inward side, in the vehicle width direction, of the vehicle.
Figure 6:
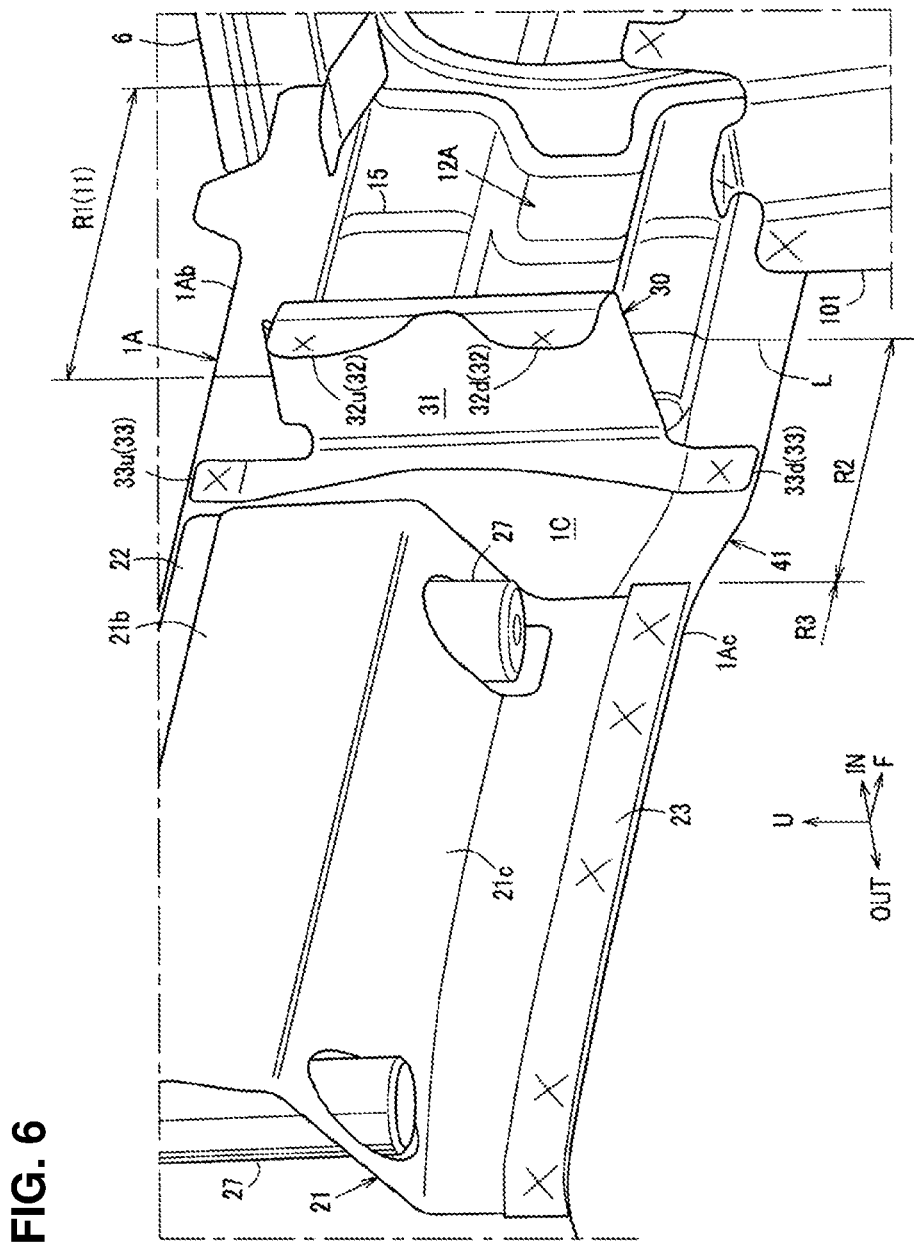
FIG. 6 is a view of the structure shown in FIG. 5, when viewed from an arrow D direction.
Figure 7:
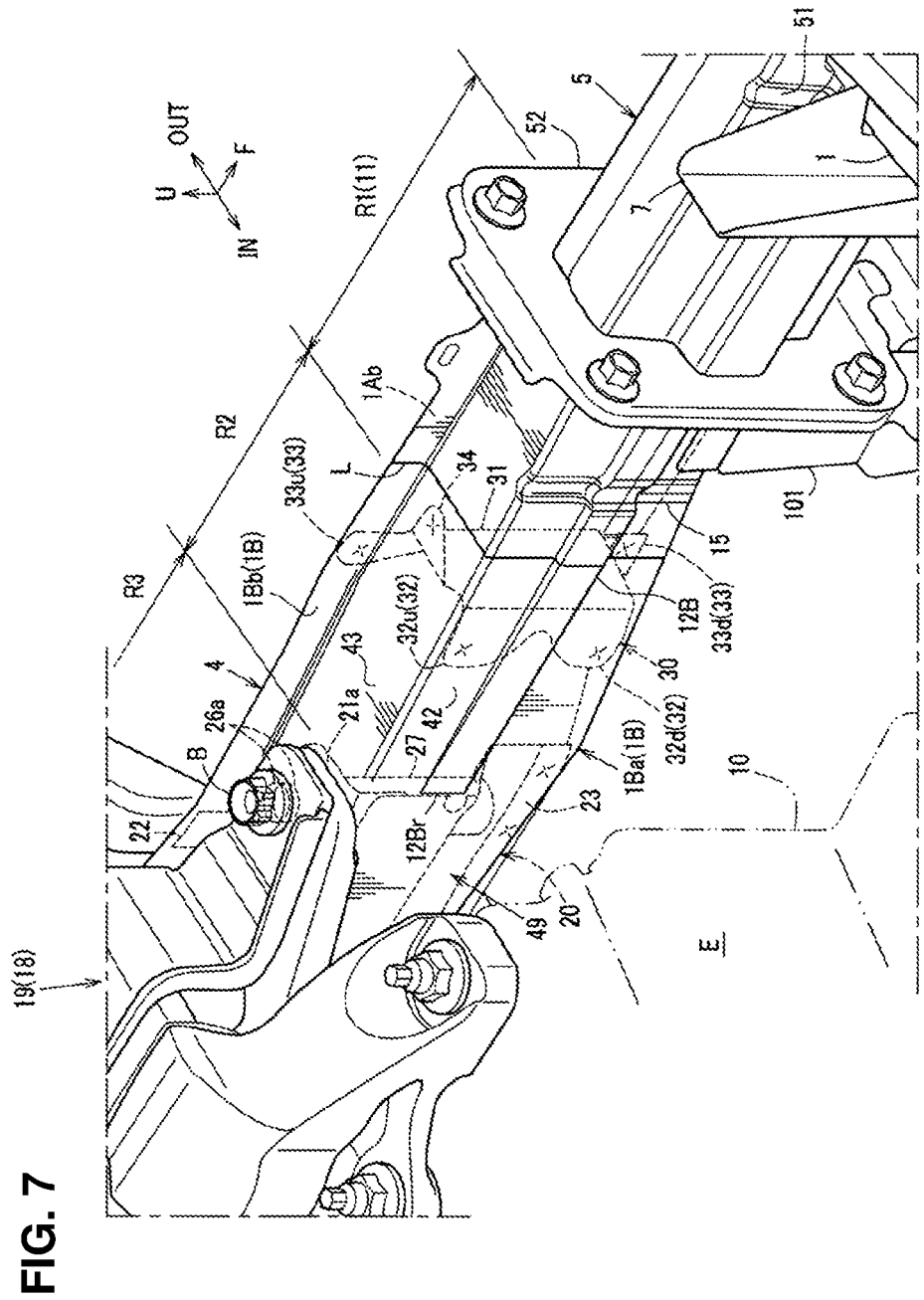
FIG. 7 is a view of the structure shown in FIG. 1, when viewed from an arrow A direction and an upward side.

The crash can 5, which is made of a metal-made tubal member extending in the vehicle longitudinal direction, has a roughly cross-shaped cross section perpendicular to the vehicle longitudinal direction (see FIGS. 5 and 7). Since the cross section perpendicular to the vehicle longitudinal direction of the crash can 5 is of the roughly cross shape, the section modulus of the crash can 5 is high in the vertical direction and in the vehicle width direction. Thereby, even in a case where a frontal-collision load is inputted to the crash can 5 at a position which is offset vertically or laterally from the crash can 5 in an offset collision, the crash can 5 is prevented from being bent and is compressively deformed in a bellows manner (i.e., axially compressed), thereby effectively absorb the frontal-collision load.

As shown in FIGS. 1-4, an attaching plate 52 which is attached to a front end portion of the front side frame 4 is fixed to a rear end portion of the crash can 5. The both end portions, in the vehicle width direction, of the bumper beam 1 is joined to respective front end portions of the crash cans 5 via brackets 7.

Figure 10:
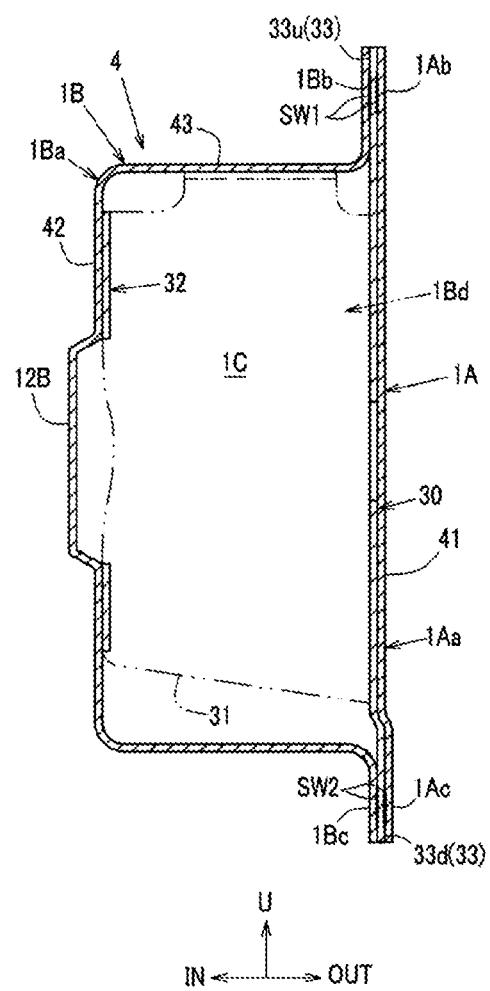
FIG. 10 is an enlarged sectional view taken along line B-B of FIG. 1.

The front side frame 4 comprises an outer panel 1A (see FIG. 5) which is made of a flat-plate shaped steel plate member and forms an outer wall face portion 41 of the front side frame 4 and an inner panel 1B (see FIG. 7) which is arranged on an inward side, in the vehicle width direction, of the outer panel 1A and made of a steel plate member having a hat-shaped cross section opened outward in the vehicle width direction, i.e., having an opening 1Bd (see FIG. 10).

The outer panel 1A comprises, as shown in FIGS. 1, 4-6, 8 and 10, especially as shown in FIG. 10, an outer panel body portion 1Aa which is configured in a flat-plate shape, an outer upper flange portion 1Ab which is configured to protrude upward from an upper edge of the outer panel body portion 1Aa, and an outer lower flange portion 1Ac which is configured to protrude downward from a lower edge of the outer panel body portion 1Aa, which are formed integrally.

The inner panel 1B comprises, as shown in FIGS. 1, 2, 7, 8 and 10, especially as shown in FIG. 10, an inner panel body portion 1Ba which is configured to have a U-shaped cross section (in an elevational view) and constitutes an inner wall face portion 42 of the front side frame 4, an inner upper flange portion 1Bb which is configured to protrude upward from an upper edge of the opening 1Bd of the inner panel body portion 1Ba, and an inner lower flange portion 1Bc which is configured to protrude downward from a lower edge of the opening 1Bd, which are formed integrally.

As shown in FIG. 10, the outer panel 1A is provided to close the opening 1Bd which is opened to the outward side, in the vehicle width direction, of the inner panel 1B, and these panels 1A, 1B are joined together by fixing the outer upper flange portion 1Ab and the inner upper flange portion 1Bb and also the outer lower flange portion 1Ac and the inner lower flange portion 1Bc at respective plural joint points arranged in the vehicle longitudinal direction by means of spot welding or the like. Thereby, the front side frame 4 has a closed cross section 1C (space) extending in the vehicle longitudinal direction inside as shown in FIGS. 8 and 10.

Further, as shown in FIGS. 1-4, a set plate 6 is fixed to the front end portion of the front side frame 4, and the above-described attaching plate 52 of the crash can 5 is attached to the set plate 6 with bolts or the like.

As shown in FIGS. 2-8, the front side frame 4 supports a powertrain 10 (PT) via a powertrain mount 18 (hereafter, referred to as "PT mount 18"), and at a roughly middle position between a joint portion 48 (see FIGS. 1 and 8) of the front side frame 4 to the dash panel 2 in the vehicle longitudinal direction and the set plate 6 is provided a mount-bracket attachment part 49 for attaching a powertrain mount bracket 19 (hereafter, referred to as "PT mount bracket 19") provided at the PT mount 18.

Herein, in the present embodiment, the powertrain 10 is configured such that a laterally-disposed engine is arranged at a right side in the engine room E and a transmission equipped with some gears is arranged at a left side in the engine room E. Accordingly, the left-side PT mount 18 shown in FIG. 1 and others serves as a transmission mount, and the right-side PT mount, not illustrated, serves as an engine mount.

Figure 3:
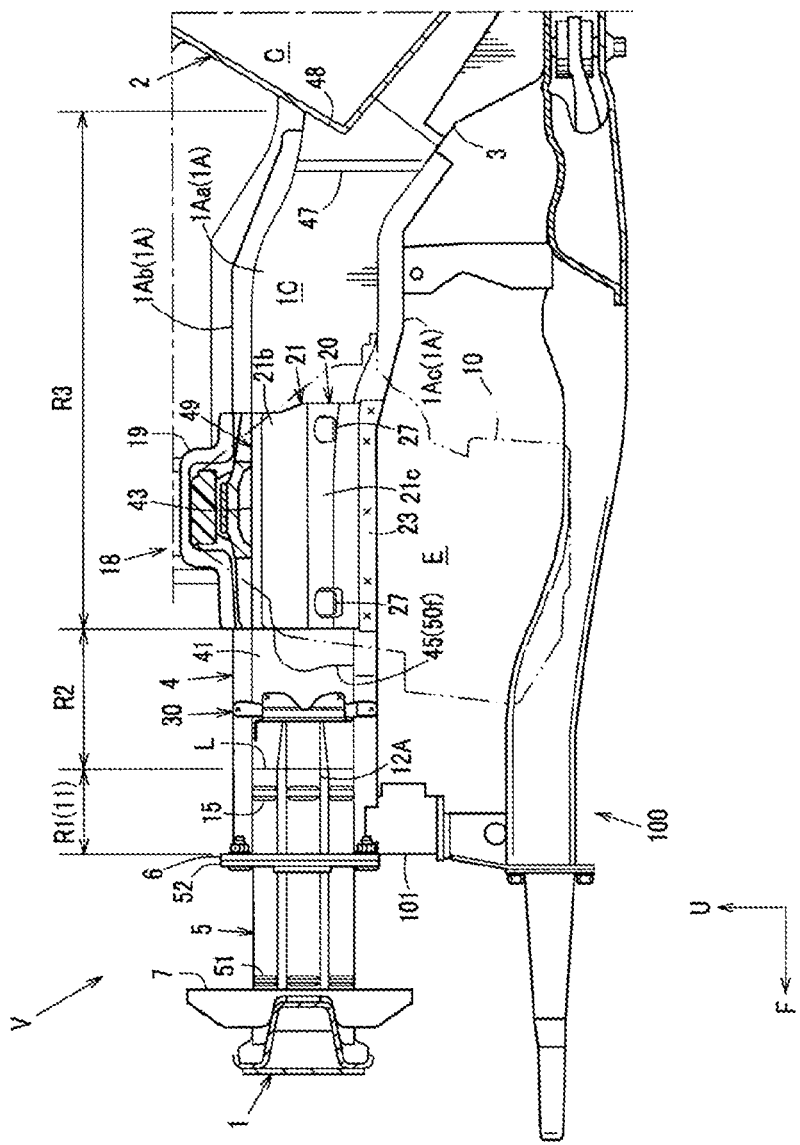
FIG. 3 is a sectional view showing a state where an inner panel of a front side frame is removed from the structure shown in FIG. 2.
Figure 4:
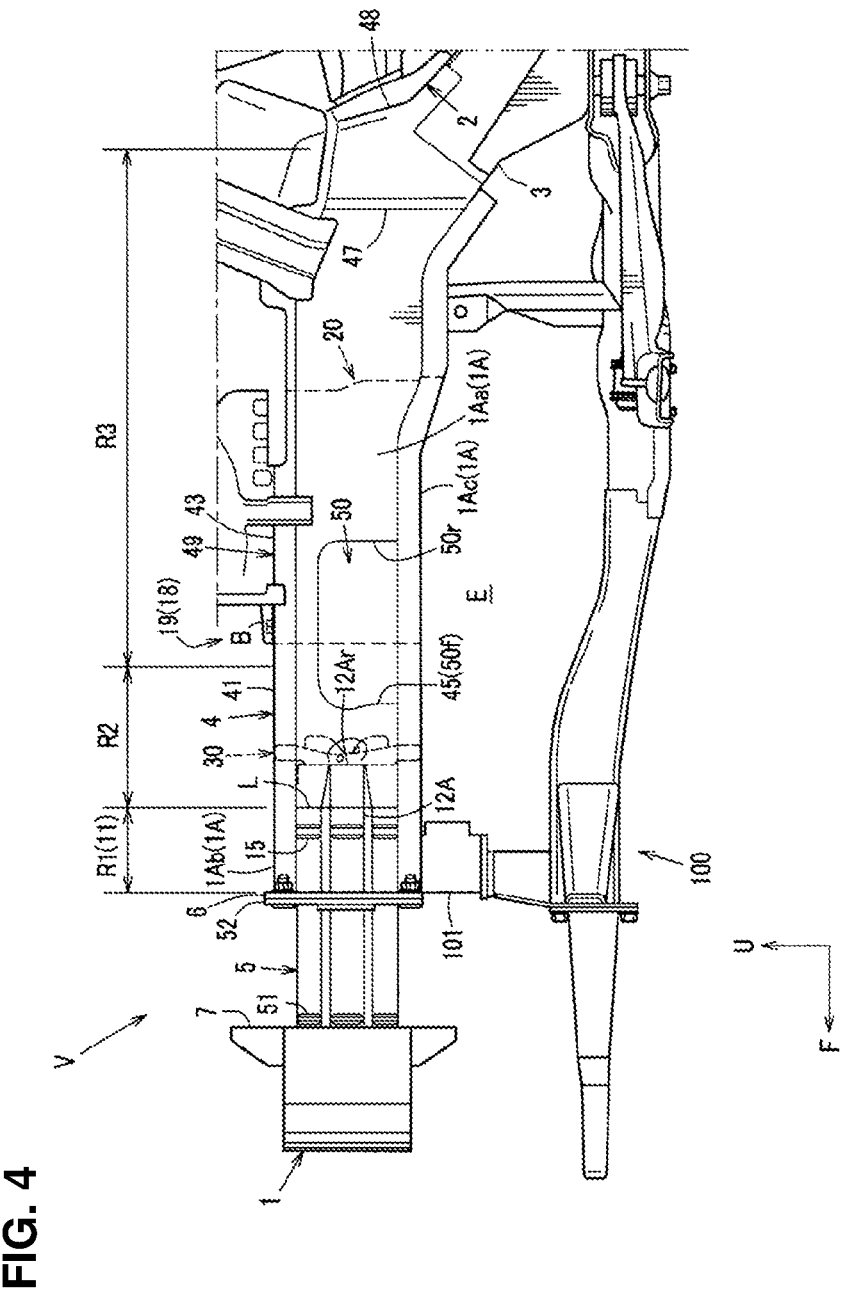
FIG. 4 is a left-side sectional view of the main part of the front vehicle-body structure of the vehicle.

As shown in FIGS. 3-5, the mount-bracket attachment part 49 is provided with a mount reinforcing member 20. This mount reinforcing member 20 comprises a reinforcing-member body portion 21 (see FIGS. 3, 5 and 6) which is configured to protrude inward in the vehicle width direction, a reinforcing-member upper flange portion 22 (see FIGS. 5 and 6) which is configured to protrude upward from an outer and upper edge of the reinforcing-member body portion 21, and a reinforcing-member lower flange portion 23 (see FIGS. 3, 5 and 6) which is configured to protrude downward from an outer and lower edge of the reinforcing-member body portion 21, which is made of a steel material.

The reinforcing-member body portion 21 comprises an inner wall face portion 21b (see FIGS. 3, 5 and 6) which extends in the vertical direction on the outward side, in the vehicle width direction, of the vehicle, an upper wall face portion 21a (see FIGS. 5 and 7) which connects an upper end of the inner wall face portion 21b and a lower end of the reinforcing-member upper flange portion 22, and a lower wall face portion 21c (see FIGS. 3, 5 and 6) which connects a lower end of the inner wall face portion 21b and an upper end of the reinforcing-member lower flange portion 23.

Herein, as shown in FIG. 5, the mount reinforcing member 20 comprises an upper member 24 which mainly constitutes the upper wall face portion 21a and the reinforcing-member upper flange portion 22 and a lower member 25 which mainly constitutes the inner wall face portion 21b, the lower wall face portion 21c, and the reinforcing-member lower flange portion 23, which are joined together.

The reinforcing-member upper flange portion 22 is interposed between the outer upper flange portion 1Ab and the inner upper flange portion 1Bb of the front side frame 4, and these three-sheet members 1Ab, 22, 1Bb are joined together by spot welding (see FIG. 7).

Likewise, the reinforcing-member lower flange portion 23 is interposed between the outer lower flange portion 1Ac and the inner lower flange portion 1Bc, and these three-sheet members 1Ac, 22, 1Bc are joined together by spot welding (see FIGS. 3, 5 and 7).

Herein, arrows X applied to the mount reinforcing member 20 in FIGS. 3, 5 and 7 show welding points of the outer lower flange portion 1Ac, the reinforcing-member lower flange portion 23, and the inner lower flange portion 1Bc. Likewise, the outer upper flange portion 1Ab, the reinforcing-member upper flange portion 22, and the inner upper flange portion 1Bb are joined at welding points, not illustrated.

Further, the upper wall face portion 21a and the inner wall face portion 21b of the reinforcing-member body portion 21 are provided such that they respectively contact an upper wall face portion 43 and the outer wall face portion 41 at the mount bracket attachment part 49 of the front side frame 4 from the side of the closed cross section 1C (see FIGS. 5, 7 and 8), and these contact points are joined by spot welding.

As shown in FIGS. 1 and 5, the upper wall face portion 21a and the inner wall face portion 21b of the reinforcing-member body portion 21 and the upper wall face portion 21a at the mount-bracket attachment part 49 respectively have two attaching holes 26a, 26b which are arranged longitudinally. As shown in FIGS. 3, 5-7 and 8, pipe-shaped weld nuts 27 which extend downward from a lower face of the upper wall face portion 21a of the reinforcing-member body portion 21 are provided such that these nuts 27 correspond to the two attaching holes 26a, 26b in the plan view.

The weld nuts 27 are fixed to the lower face of the upper wall face portion 21a of the reinforcing-member body portion 21 and also fixed to the inner wall face portion 42 of the reinforcing-member body portion 21 via a support member 28 as shown in FIG. 8. Thereby, the weld nuts 27 are supported at the reinforcing-member body portion 21.

As shown in FIGS. 1, 5 and 7, the PT mount bracket 19 provided at the PT mount 18 is attached to the mount-bracket attachment part 49 of the front side frame 4 by being fastened to the weld nuts 27, together with the respective upper wall face portions 21a, 43 of the reinforcing-member body portion 21 and the mount-bracket attachment part 49, by means of the bolts B.

As shown in FIGS. 4, 5 and 8, a recess groove portion 50 is formed at the outer wall face portion 41 of the front side frame 4 such that it is recessed to the side of the closed cross section 1C (to the inward side, in the vehicle width direction, of the vehicle).

The recess groove portion 50 is configured such that its rear edge 50r is positioned between the front-side attaching hole 26a and the rear-side attaching hole 26b (see FIG. 8) and its front edge 50f is positioned in back of a gusset member 30 (see FIGS. 3, 4 and 8), which will be described later, and also in front of a front end of the mount-bracket attachment part 49 (see the same figures). The recess groove portion 50 is provided at a portion of the outer wall face portion 41 which excludes its upper portion (see FIGS. 3 and 4).

As shown in FIGS. 1-4, 7 and 8, the front side frame 4 includes, at a front portion thereof, a compressive-deformation part 11 which is configured to have substantially the same cross-shaped cross section as the crash can 5 and extend rearward, in the vehicle longitudinal direction, from the front end of the front side frame 4.

Specifically, at least at this compressive-deformation part 11 are formed an inward-side protrusion portion 12B which is configured to protrude inward, in the vehicle width direction, from a middle portion, in the vertical direction, of the inner wall face portion 42 of the compressive-deformation part 11 (see FIGS. 1, 2, 7, 8 and 10) and an outward-side protrusion portion 12A which is configured to protrude outward, in the vehicle width direction, from a middle portion, in the vertical direction, of the outer wall face portion 41 of the compressive-deformation part 11 (see FIGS. 1, 3, 4, 6 and 8). The inward-side protrusion portion 12B constitutes a right-side protrusion piece of the compressive-deformation part 11 having the cross-shaped cross section, and the outward-side protrusion portion 12A constitutes a left-side protrusion piece of the compressive-deformation part 11 having the cross-shaped cross section.

As shown in FIGS. 1-4, 7 and 8, the outward-side protrusion portion 12A and the inward-side protrusion portion 12B extend rearward from the front end of the front side frame 4 beyond the compressive-deformation part 11, and its rearward extension portion beyond the compressive-deformation part 11 is configured such that a protrusion degree (height) becomes smaller as going rearward (see FIGS. 1, 7 and 8).

Figure 2:
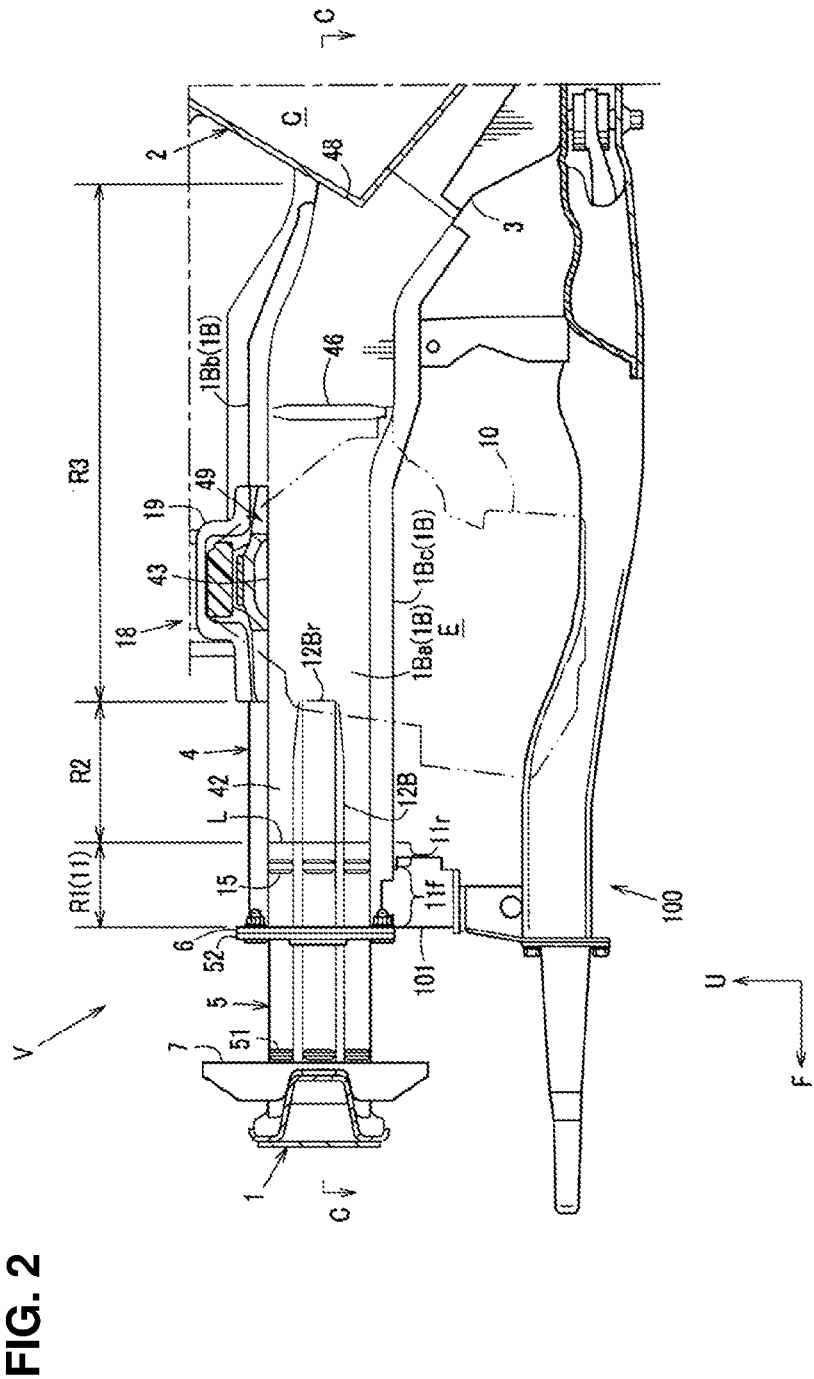
FIG. 2 is a sectional view of the main part of the front vehicle-body structure of the vehicle of the present embodiment, when viewed from an inward side, in a vehicle width direction, of the vehicle.

The outward-side protrusion portion 12A is configured such that its rear end 12Ar extends rearward up to a position located in front of the front edge 50f of the recess groove portion 50, more specifically up to an arrangement position of the gusset member 30 (see FIGS. 4 and 8), and the inward-side protrusion portion 12B is configured such that its rear end 12Br extends rearward to the mount-bracket attachment part 49, that is, up to a position corresponding to a front edge of the mount reinforcing member 20 (see FIGS. 2, 7 and 8). That is, the inward-side protrusion portion 12B extends rearward such that its longitudinal length is longer than the outward-side protrusion portion 12A (see FIG. 8).

Meanwhile, a portion of the front side frame 4 which is located in back of a front end of the mount-bracket attachment part 49, that is, a front end of the mount reinforcing member 20, is configured to have a roughly rectangular-shaped cross section perpendicular to the vehicle longitudinal direction (see FIGS. 1 and 8).

The outward-side protrusion portion 12A and the inward-side protrusion portion 12B are configured such that their protrusion degree (height) at the position located in back of the compressive-deformation part 11 becomes smaller as going rearward as described above (see FIGS. 1, 7 and 8). According to this configuration, an intermediate part, in the vehicle longitudinal direction, of the front side frame 4 between the compressive-deformation part 11 and the mount-bracket attachment part 49 is configured such that a shape of a cross section thereof perpendicular to the vehicle longitudinal direction gradually changes from the roughly cross shape to the roughly rectangular shape as going rearward (see FIGS. 1-4, 7 and 8).

As shown in FIG. 8, in particular, by respective enlarged portions of the X1 portion and the X2 portion, the compressive-deformation part 11 of the front side frame 4 is configured as a thin portion Tn such that respective portions of the outer panel 1A and the inner panel 1B which correspond to this compressive-deformation part 11 have substantially the same plate thickness as the crash can 5.

Meanwhile, a rearward portion of the front side frame 4 which is positioned in back of the compressive-deformation part 11 is configured as a thick portion Tc such that respective portions of the outer panel 1A and the inner panel 1B which correspond to this portion have a larger plate thickness than the compressive-deformation part 11 (a low-strength area R1, which will be described later).

As shown in FIGS. 1-4, 6, 7 and 8, a plate-thickness change line L where the plate thickness changes stepwise is formed along a circumferential direction of the front side frame 4 at a rear end portion of the compressive-deformation part 11 of the front side frame 4, that is, on a surface of a portion of the front side frame 4 which corresponds to the border between the thin portion Tn and the thick portion Tc.

The front side frame 4 having the thin portion Tn and the thick portion Tc can be formed by a tailored-weld blank method where steel plates having different plate thickness are joined by laser welding, plasma welding, or the like and then press-formed, or a tailored-rolled blank method where the plate thickness is changed by adjusting a roll gap during rolling.

As shown in FIGS. 1-8, the front side frame 4 is partitioned, in accordance with the strength against the frontal-collision load, into the low-strength area R1 (which corresponds to the above-described compressive-deformation part 11 of the front side frame 4), a middle-strength area R2 (which corresponds to an "intermediate part" of the front side frame 4 in the claim) and a high-strength area R3 (which corresponds to a "rear part" of the front side frame 4 in the claim) which are positioned in order from the front end of the front side frame 4.

As shown in FIGS. 1-4 and 6-8, the low-strength area R1 corresponds to the compressive-deformation part 11 of the front side frame 4 which is configured to be compressively deformed when receiving the frontal-collision load as described above. This low-strength area R1 (the compressive-deformation part 11) is configured such that it has substantially the same sectional shape as the crash can 5, i.e., it has the roughly cross-shaped cross section in the elevational shape, as described above and also it has a low strength against the frontal-collision load so as to be compressively deformed when receiving the frontal-collision load by forming the panel surface as the thin portion Tn.

The middle-strength area R2 is an area, in the vehicle longitudinal direction, of the front side frame 4 which is positioned between a rear end (where the plate-thickness change line L is positioned) of the low-strength area R1 (the compressive-deformation part 11) and a front end of the mount-bracket attachment part 49, which is configured as the thick portion Tc having the thick plate thickness as described above such that it has the higher strength than the above-described low-strength area R1 and the shape of its cross section perpendicular to the vehicle longitudinal direction changes from the roughly cross shape to the roughly rectangular shape as going rearward.

Specifically, the middle-strength area R2 is configured such that the respective protrusion degree (height) of the outward-side protrusion portion 12A and the inward-side protrusion portion 12B become gradually smaller from the rear end of the low-strength area R1 as going rearward, and the outward-side protrusion portion 12A formed at the outer wall face portion 41 disappears first (that is, reaching at the rear end 12Ar of the outward-side protrusion portion 12A) (see FIGS. 1, 4 and 8), and subsequently the inward-side protrusion portion 12B formed at the inner wall face portion 42 disappears at a point reaching the high-strength area R3 (that is, reaching at the rear end 12Br of the inward-side protrusion portion 12B) (see FIGS. 1, 2, 7 and 8), so that the shape of the cross section perpendicular to the vehicle longitudinal direction becomes the roughly rectangular shape. The gusset member 30, which will be described later, is provided at the middle-strength area R2.

The high-strength area R3 is an area of the front side frame 4 which includes the above-described mount-bracket attachment part 49 at least, specifically which covers the area from the front end of the mount-bracket attachment part 49 to the joint portion 48 of the front side frame 4 to the dash panel 2 as shown in FIGS. 1-4 and 8. The high-strength area R3 is configured as described above such that its cross section perpendicular to the vehicle longitudinal direction is of the roughly rectangular shape and it is formed by the think portion Tc of the outer panel 1A and the inner panel 1B of the front side frame 4 which has the thicker plate thickness than the low-strength area R1. Further, as shown in FIGS. 3 and 5-8, the high-strength area R3 is configured to have the higher strength than the middle-strength area R2 by providing the mount reinforcing member 20 at the mount-bracket attachment part 49 included in the high-strength area R3.

As shown in FIGS. 1-8, in particular in FIGS. 3-5 and 8, the gusset member 30 as the reinforcing member for preventing shearing deformation of the closed cross section 1C of the front side frame 4 is provided at a position located nearly in front of the front edge 50f of the recess groove portion 50 formed at the outer wall face portion 41, that is, at the position located in back of the middle-strength area R2.

As shown in FIGS. 9A, 9B, 9C and 9D, the gusset member 30 comprises a flat-plate shaped gusset-member body portion 31 (see FIGS. 5-7) which partitions the closed cross section 1C of the front side frame 4 which extends in the vehicle longitudinal direction, an inner-side joint flange portion 32 (see the same figures) which protrudes rearward from an inward end, in the vehicle width direction, of the gusset-member body portion 31, an outer-side joint flange portion 33 (see the same figures) which protrudes rearward from an outward end, in the vehicle width direction, of the gusset-member body portion 31, and an upper-side joint flange portion 34 (see FIGS. 5 and 7) which protrudes forward from an upper end of the gusset-member body portion 31, which are formed integrally.

Likewise, as shown in FIGS. 9A, 9B, 9C and 9D, the inner-side joint flange portion 32 is provided with an upper-side rearward extension portion 32*u* which extends rearward from an upper portion of its rear end side and a lower-side rearward extension portion 32*d* which extends rearward from a lower portion of its rear end side. The outer-side joint flange portion 33 is provided with an upward extension portion 33*u* which extends upward from its upper end and a downward extension portion 33*d* which extends downward from its lower end.

Herein, while both the inner-side joint flange portion 32 and the outer-side joint flange portion 33 extend rearward relative to the gusset-member body portion 31 as descried above, the inner-side joint flange portion 32 is configured such that the upper-side rearward extension portion 32*u* and the lower-side rearward extension portion 32*d* extend rearward beyond the outer-side joint flange portion 33 as shown in FIGS. 3 and 9B, 9C and 9D. That is, the inner-side joint flange portion 32 is configured such that the upper-side rearward extension portion 32*u* and the lower-side rearward extension portion 32*d* are offset rearward from the outer-side joint flange portion 33.

Arrows X applied to the gusset member 30 in FIGS. 3, 5 and 7 show spot welding points of the front side fame 4 and the gusset member 30. The upper-side joint flange portion 34 of the gusset member 30 is joined to the upper wall face portion 43 of the front side frame 4 by spot welding (see FIGS. 5 and 7). Further, the upper-side rearward extension portion 32*u* which is provided at the inner-side joint flange portion 32 of the gusset member 30 is spot-welded to an upper portion of the inward-side protrusion portion 12B formed at the inner wall face portion 42 of the front side frame 4, and the lower-side rearward extension portion 32*d* which is provided at the inner-side joint flange portion 32 of the gusset member 30 is spot-welded to a lower portion of the inward-side protrusion portion 12B formed at the inner wall face portion 42 of the front side frame 4 (see FIGS. 5-7).

Moreover, as shown in FIGS. 3, 6, 7 and 10, the upward extension portion 33*u* which is provided at the outer-side joint flange portion 33 of the gusset member 30 is interposed between the outer upper flange portion 1Ab and the inner upper flange portion 1Bb of the front side frame 4, and these three-sheet portions 1Ab, 33*u*, 1Bb are joined together by spot welding (see SW1 in FIG. 10).

Likewise, the downward extension portion 33*d* which is provided at the outer-side joint flange portion 33 of the gusset member 30 is interposed between the outer lower flange portion 1Ac and the inner lower flange portion 1Bc, and these three-sheet portions 1Ac, 33*d*, 1Bc are joined together by spot welding (see SW2 in FIG. 10 particularly).

Herein, as shown in FIGS. 2-4, a sub frame 100 is arranged below the front side frame 4, and a front portion of the sub frame 100 is joined to a lower portion of a forward portion 11*f* (see FIG. 2) of the compressive-deformation part 11 of the front side frame 4 via a boxy-shaped sub-frame connecting bracket 101 which extends in the vertical direction as shown in FIGS. 2-7.

As shown in FIGS. 1-4 and 6-8, a compressive-deformation causing portion 15 which causes compressive deformation of the compressive-deformation part 11 is provided at the outer wall face portion 41 and the inner wall face portion 42 at a position located nearly in back of its joint portion (the forward portion 110 to the sub-frame connecting bracket 101. This compressive-deformation causing portion 15 is constituted by a recess groove which is provided to extend in the vertical direction so as to cause the compressive deformation of a portion of the compressive-deformation portion 11 which is positioned in back of the joint portion to the sub-frame connecting bracket 101 in the vehicle frontal collision.

Herein, the compressive-deformation causing portion 15 is the recess groove which serves as a causing point of the compressive deformation of a rearward portion 11*r* of the compressive-deformation part 11 primarily, this may serve as a causing point of bending of the compressive-deformation part 11 according to a manner of the frontal-collision load.

Further, as shown in FIGS. 1-4, 7 and 8, a compressive-deformation causing portion 51 is also provided at the outer wall face portion 41 and the inner wall face portion 42 at a position located nearly in back of a front end of the crash can 5. This compressive-deformation causing portion 51 is a recess groove which is provided to extend in the vertical direction so as to cause compressive deformation of the crash can 5.

In the vehicle frontal collision, particularly in an initial stage of this collision, the crash can 5 is compressively rearward deformed having a compressive-deformation causing point of the compressive-deformation causing portion 51, and also the compressive-deformation part 11 (the low-strength area R1) is compressively rearward deformed by the frontal-collision load applied in the vehicle frontal collision, whereby the frontal-collision load is absorbed.

Herein, while the forward portion 11*f* (see FIG. 2) of the compressive-deformation part 11 which is positioned in front of the compressive-deformation causing portion 15 is compressively deformed by the frontal-collision load, there is a concern that the strength of the forward portion 11*f* against the frontal-collision load may become higher than the rearward portion 11*r* (see FIG. 2) because the sub-frame connecting bracket 101 is joined to the lower portion of the forward portion 11*f*. However, since the compressive-deformation causing portion 15 is provided at the rear edge 50*r* of the connection portion of the sub-frame connecting bracket 101 in the low-strength area R1, the compressive-deformation causing portion 15 serves as the causing point to cause the compression deformation in the vehicle frontal collision, so that the rearward portion 11*r* is compressively deformed more than the forward portion 11*r*, whereby the collision load is absorbed in the low-strength area R1.

As shown in FIGS. 3, 4 and 8, the front edge 50*f* of the above-described recess groove portion 50 is configured as an outer front-side bending-deformation causing portion 45 which causes the inward bending deformation of the front side frame 4 when receiving the frontal-collision load.

As shown in FIGS. 2 and 8, an inner-side bending-deformation causing portion 46 which is configured by a recess groove extending in the vertical direction is formed at a portion of the front side frame 4 which is located in back of the mount-bracket attachment part 49 and in front of an outer rear-side bending-deformation causing portion 47 (see FIG. 3) which will be described later. This inner-side bending-deformation causing portion 46 is configured by a recess groove which is provided at the inner wall face portion 42 to extend in the vertical direction so as to cause the outward bending deformation of the front side frame 4 when receiving the frontal-collision load.

As shown in FIGS. 3-5 and 8, the outer rear-side bending-deformation causing portion 47 is provided at a portion of the outer wall face portion 41 which is positioned at a base-end side of an extension portion of the front side frame 4 which roughly horizontally extends forward from the dash panel 2, that is, positioned nearly in front of the joint portion 48 to the dash panel 2.

As described above, the outer front-side bending-deformation causing portion 45 configured as the front edge 50f of the recess groove portion 50 extending in the vertical direction and the outer rear-side bending-deformation causing portion 47 configured by the recess groove extending in the vertical direction are both formed at the outer wall face portion 41 so as to cause the inward bending deformation of the front side frame 4 when receiving the frontal-collision load. Further, the outer front-side bending-deformation causing portion 45 is formed in the middle-strength area R2, and the inner-side bending-deformation causing portion 46 and the outer rear-side bending-deformation causing portion 47 are formed in the high-strength area R3.

Herein, in a case where the energy of the frontal-collision load is not completely absorbed by the compressive deformation of the crash can 5 and the low-strength area R1 (the compressive-deformation part 11) of the front side frame 4 only, the front side frame 4 has breaking deformation (bending deformation) at least at three points of the outer front-side bending-deformation causing portion 45, the inner-side bending-deformation causing portion 46, and the outer rear-side bending-deformation causing portion 47.

Figure 11:
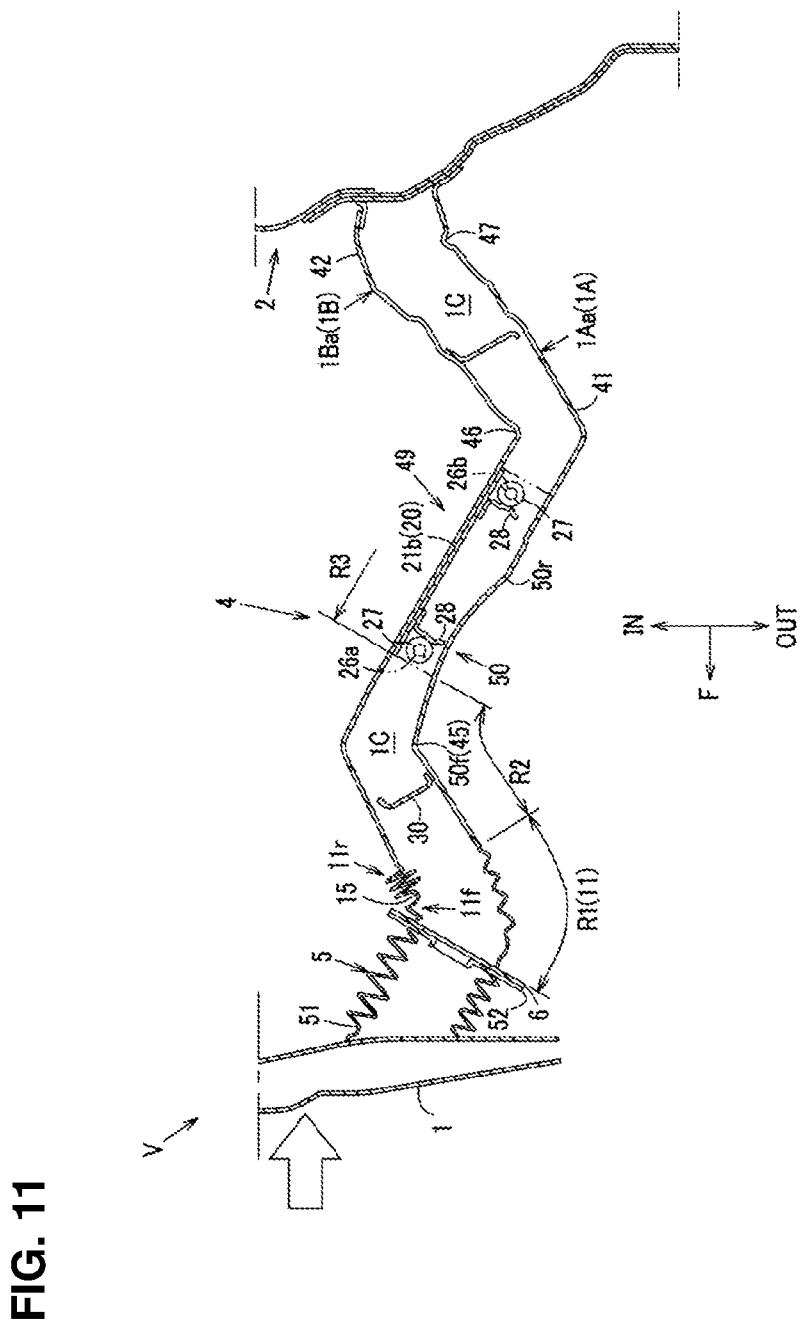
FIG. 11 is a sectional view of the main part of the front vehicle-body structure of the vehicle of the present embodiment in a state where the front side frame has been deformed in a vehicle frontal collision, which corresponds to FIG. 8.

Specifically, as shown in FIG. 11, when the frontal-collision load (see a bold arrow in FIG. 11) is applied, the front side frame 4 is bent such that it protrudes inward, in the vehicle width direction, at the outer front-side bending-deformation causing portion 45, such that it protrudes outward, in the vehicle width direction, at the inner-side bending-deformation causing portion 46, and such that it protrudes inward, in the vehicle width direction, at the outer rear-side bending-deformation causing portion 47.

Herein, while the crash can 5 and the compressive-deformation part 11 of the front side frame 4 are both linearly rearward compressively deformed (axially deformed) when receiving the frontal-collision load, the compressive-deformation part 11 of the front side frame 4 may be linearly rearward compressively deformed and also bent outward, in the vehicle width direction, at the compressive-deformation causing portion 15 according to a manner of the frontal-collision load as shown in FIG. 11, for example. That is, while the front side frame 4 may have a bending deformation mode having four bending points of the above-described three bending-deformation causing portions 45, 46, 47 plus the compressive-deformation causing portion 15 according to the manner of the frontal-collision load (see FIG. 11), the front side frame 4 can absorb the collision energy through its compressing and bending in this case as well.

The front vehicle-body structure V of the vehicle of the present embodiment comprises the front side frame 4 having the closed cross section C1 extending in the vehicle longitudinal direction and including the mount-bracket attachment part 49 for attaching the PT mount bracket 19 provided at the PT mount 18 for supporting the powertrain 10, and the crash can 5 attached to the front end of the front side frame 4, wherein the front side frame 4 includes the compressive-deformation part 11 which is configured to be compressively deformed in the vehicle frontal collision and extend rearward from the front end thereof, having substantially the same sectional shape as the crash can 5, and the gusset member 30 as the reinforcing member for preventing the shearing deformation of the closed cross section C1 of the front side frame 4 is provided at the portion of the front side frame 4 between the mount-bracket attachment part 49 and the compressive-deformation part 11 (see FIGS. 1, 3, 5-11).

According to the above-described structure, the sectional deformation of the front side frame's cross section (the above-described closed cross section 1C) perpendicular to the vehicle longitudinal direction which is caused by the gear noise generated by the transmission which is transmitted via the PT mount bracket 19 to the portion of the front side frame 4 which is located between the mount-bracket attachment part 49 and the set plate 6 can be suppressed by the gusset member 30, that is, vibration amplification is so suppressed that the vibration transmitted rearward (to the cabin) can be reduced, thereby improving the NVH performance. Further, since the gusset member 30 is positioned in back of the compressive-deformation part 11 (the low-strength area R1) of the front side frame 4 which is configured to be compressively deformed in the vehicle frontal collision, the NVH performance and the load absorption performance in the vehicle collision can be compatibly achieved, without blocking the proper deformation of the front side frame.

In the present embodiment, the outer front-side bending-deformation causing portion 45 which causes the inward bending deformation, in the vehicle width direction, of the front side frame 4 when receiving the frontal-collision load is provided at the portion of the front side frame 4 between the gusset member 30 and the mount-bracket attachment part 49 (see FIGS. 3, 4 and 8).

According to this structure, since the outer front-side bending-deformation causing portion 45 is provided at the portion of the front side frame 4 between the gusset member 30 and the mount-bracket attachment part 49, the proper bending deformation of the front side frame 4 which is caused by the outer front-side bending-deformation causing portion 45 in the vehicle frontal collision is not so blocked by the gusset member 30 and the mount-bracket attachment part 49 that the NVH performance and the load absorption performance can be compatibly achieved.

In the present embodiment, the compressive-deformation causing portion 15 which causes the rearward compressive deformation of the compressive-deformation part 11 of the front side frame 4 is provided at the compressive-deformation part 11 (see FIGS. 1-4, 7 and 8).

According to this structure, since the compressive-deformation causing portion 15 is provided at the compressive-deformation part 11, the compressive-deformation part 11 is so securely compressively deformed in the vehicle frontal collision that the load absorption performance can be improved in cooperation with the crash can 5, particularly in the initial stage of collision.

In the present embodiment, each of the crash can 5 and the compressive-deformation part 11 of the front side frame 4 has the roughly cross-shaped cross section perpendicular to the vehicle longitudinal direction (see FIGS. 1-5, 7 and 8).

According to this structure, since each cross section perpendicular to the vehicle longitudinal direction of the crash can 5 and the compressive-deformation part 11 of the front side frame 4 is of the roughly cross shape, the section modulus of these members 5, 11 can be increased both in the vertical direction and in the vehicle width direction. Accordingly, even in a case where the frontal-collision load is inputted from a position which is offset vertically or laterally from the front side frame 4 extending in the vehicle longitudinal direction and the crash can 5, the crash can 5 and the compressive-deformation part 11 can be properly prevented from being deformed in a falling manner (i.e., from being bent) because of blocking of the convex portions protruding vertically and laterally (the outward-side protrusion portion 12A and the inward-side protrusion portion 12B) which are formed at each roughly cross-shaped cross section thereof. Consequently, the compressive deformation of each of the crash can 5 and the compressive-deformation part 11 of the front side frame 4 is so securely attained that the collision load can be properly absorbed.

In the present embodiment, the front side frame 4 further includes the middle-strength area R2 (the intermediate part) which is positioned in back of the low-strength area R1 (the compressive-deformation part 11) and configured such that the shape of its cross section perpendicular to the vehicle longitudinal direction changes from the roughly cross shape to the roughly rectangular shape as going rearward and the high-strength area R3 (the rear part) which is positioned in back of the middle-strength area R2 and configured such that the shape of its cross section perpendicular to the vehicle longitudinal direction is the roughly rectangular shape (see FIGS. 1-4, 7 and 8).

According to this structure, since the middle-strength area R2 interconnects the low-strength area R1 (the compressive-deformation part 11) having the roughly cross-shaped cross section and the high-strength area R3 having the roughly rectangular-shaped cross section in the vehicle longitudinal direction such that the shape of the middle-strength area's R2 cross section gradually changes in the vehicle longitudinal direction, the frontal-collision load can be smoothly transmitted from the low-strength area R1 (the compressive-deformation part 11) to the high-strength area R3 by way of the middle-strength area R2.

In the present embodiment, the front side frame 4 comprises the outer panel 1A and the inner panel 1B which forms the closed cross section C1 together with the outer panel 1A, the gusset member 30 is provided with the outer-side joint flange portion 33 (the upward extension portion 33u and the downward extension portion 33d) as the joint flange portion to be joined to the front side frame 4, and the joint portion of the outer panel 1A and the inner panel 1B (specifically, the joint portion of the outer upper flange portion 1Ab and the inner upper flange portion 1Bb, and the joint portion of the outer lower flange portion 1Ac and the inner lower flange portion 1Bc) is integrally joined to the outer-side joint flange portion 33 such that the outer-side joint flange portion 33 is disposed between the outer panel 1A and the inner panel 1B (see FIGS. 7 and 10).

According to this structure, even in a case where a shearing force (moment) is inputted to the front side frame 4 via the PT mount bracket 19, which is caused by the gear noise being transmitted to the front-side portion of the front side frame 4 which is positioned in front of the mount-bracket attachment part 49, the sectional deformation (sectional collapse) of the front side frame 4 can be suppressed more effectively than a case where the outer-side joint flange portion 33 is joined to the respective panels 1A, 1B separately.

Further, since the outer-side joint flange portion 33 (the upward extension portion 33u and the downward extension portion 33d) is integrally joined to the both panels 1A, 1B such that the outer-side joint flange portion 33 is disposed between the outer panel 1A and the inner panel 1B, the productivity can be secured more than the case where the outer-side joint flange portion 33 is joined to the respective panels 1A, 1B separately.

Figure 9B:
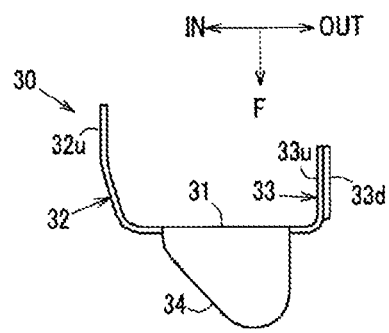
FIGS. 9A, 9B, 9C and 9D are an elevational view, a plan view, a left-side sectional view, and a right-side sectional view of a gusset member, respectively.
Figure 9C:
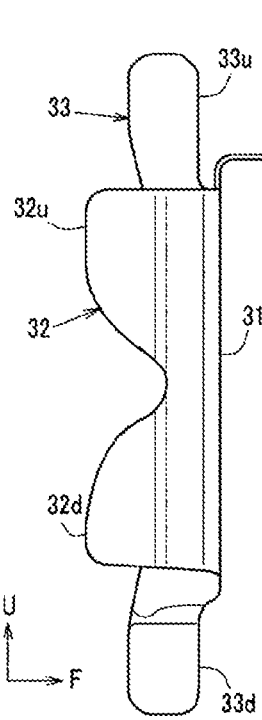
Figure 9A:
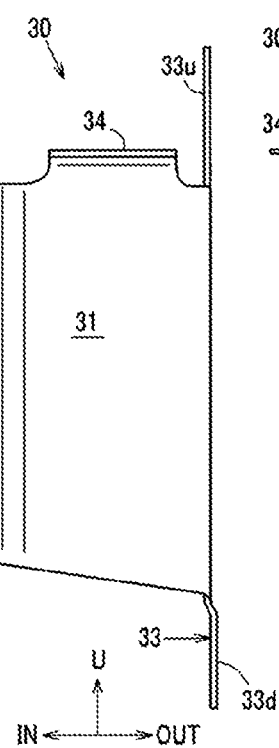
Figure 9D:
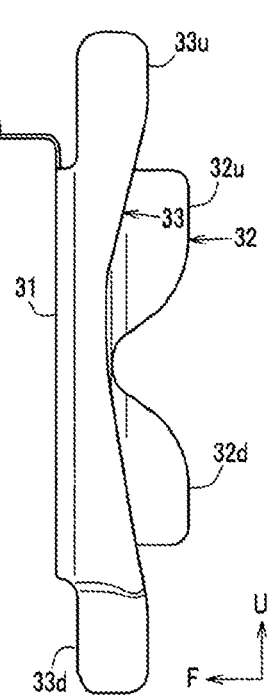

In the present embodiment, the inner panel 1B is configured to have the hat-shaped opening 1Bd opened outward, in the vehicle width direction (see FIG. 10), and the outer panel 1A is configured in a plate shape such that the opening 1Bd of the inner panel 1B is closed with the outer panel 1A, the gusset member 30 comprises the body portion 31 as a reinforcing-member body portion, the inner-side joint flange portion 32 which is joined to the inner wall face portion 42 as an inward-side face portion, in the vehicle width direction, of the inner panel 1B from the side of the closed cross section C1, and the outer-side joint flange portion 33 which is joined to the outer wall portion 41 as an outward-side face portion, in the vehicle width direction, of the outer panel 1A from a side of the closed cross section C1 (see FIGS. 5-7, 9A, B, C, D and 10), the inner-side joint flange portion 32 and the outer-side joint flange portion 33 are configured to protrude in the same direction, in the vehicle longitudinal direction, relative to the gusset-member body portion 31 (to protrude rearward in the present embodiment), and the inner-side joint flange portion 32 is provided to be offset, in the vehicle longitudinal direction, from the outer-side joint flange portion 33 in the vehicle side view (see FIGS. 3, 4, 9A, B, C, D).

According to this structure, when the inner-side joint flange portion 32 (the upper-side rearward extension portion 33u and the lower-side rearward extension portion 32d) is welded to the inner panel 1B, a welding gun, not illustrated, is inserted into the closed cross section 1C from the opening 1Bd in a state where the opening 1Bd is not closed with the inner panel 1B. Herein, it can be prevented that proper welding of the inner panel 1B and the inner-side joint flange portion 32 is blocked by interference of the welding gun with the outer-side joint flange portion 33, so that the welding work can be securely conducted.

Further, since the outer-side joint flange portion 33 and the inner-side joint flange portion 32 are configured to protrude in the same direction, in the vehicle longitudinal direction, relative to the gusset-member body portion 31 (to protrude rearward in the present embodiment), these portions 33, 32 are joined to the side frame 4 on the same rearward side, in the vehicle longitudinal direction, relative to the gusset-member body portion 31, so that an operational stroke of the welding gun is so suppressed, for example, that the welding can be made properly smooth.

In the present embodiment, the mount-reinforcing member 20 is provided at the mount-bracket attachment part 49 of the front side frame 4 so as to reinforce the mount-bracket attachment part 49 (see FIGS. 3 and 5-8).

According to this structure, the rigidity of the mount-bracket attaching part 49 can be increased by the mount-reinforcing member 20 provided at the mount-bracket attachment part 49, so that the NVH performance can be improved by reducing the gear noise or the engine noise transmitted from the powertrain 10 to the front side frame 4 via the PT mount 18.

Further, since the mount-reinforcing member 20 is provided at the mount-bracket attachment part 49, a portion of the front side frame 4 which corresponds to the mount-bracket attachment part 49 can be prevented from being bent and deformed in the vehicle frontal collision.

The present invention is not limited to the above-described embodiment, but can be configured as various embodiments. The above-described gusset member 30 is not limited to the above-described structure, but any structural member is applicable as long as it is configured to prevent the shearing deformation of the closed cross section 1C, such as a member diagonally connecting the closed cross section 1C or a member connecting two sides (two faces) forming a corner portion of the closed cross section 1C, which are not illustrated in the drawings.

The above-described compressive-deformation causing portion 15, outer front-side bending-deformation causing portion 45, inner-side bending-deformation causing portion 46, and outer rear-side bending-deformation causing portion 47 are not limited to any particular structure as long as it is configured to be bent and deformed when receiving the frontal-collision load, such as a concave-shaped bead (or a convex-shaped bead) or a fragile portion (a thin portion, a hole portion) which are formed at least at one of the outward side and the inward side, in the vehicle width direction, of the side frame.

What is claimed is:

1. A front vehicle-body structure of a vehicle, comprising:
a front side frame having a closed cross section extending in a vehicle longitudinal direction and including a mount-bracket attachment part for attaching a mount bracket provided at a powertrain mount for supporting a powertrain; and
a crash can attached to a front end of the front side frame,
wherein said front side frame includes a compressive-deformation part which is configured to be compressively deformed in a vehicle frontal collision and extend rearward from the front end thereof, having substantially the same sectional shape as said crash can, and
a reinforcing member for preventing shearing deformation of the closed cross section of said front side frame is provided at a portion of the front side frame between said mount-bracket attachment part and said compressive-deformation part.

2. The front vehicle-body structure of the vehicle of claim 1, wherein a bending-deformation causing portion which causes bending deformation, in a vehicle width direction, of said front side frame when receiving a frontal-collision load is provided at a portion of the front side frame between said reinforcing member and said mount-bracket attachment part.

3. The front vehicle-body structure of the vehicle of claim 1, wherein a compressive-deformation causing portion which causes rearward compressive deformation of said compressive-deformation part of the front side frame is provided at the compressive-deformation part.

4. The front vehicle-body structure of the vehicle of claim 2, wherein a compressive-deformation causing portion which causes rearward compressive deformation of said compressive-deformation part of the front side frame is provided at the compressive-deformation part.

5. The front vehicle-body structure of the vehicle of claim 1, wherein each of said crash can and said compressive-deformation part of the front side frame has a roughly cross-shaped cross section perpendicular to the vehicle longitudinal direction.

6. The front vehicle-body structure of the vehicle of claim 2, wherein each of said crash can and said compressive-deformation part of the front side frame has a roughly cross-shaped cross section perpendicular to the vehicle longitudinal direction.

7. The front vehicle-body structure of the vehicle of claim 3, wherein each of said crash can and said compressive-deformation part of the front side frame has a roughly cross-shaped cross section perpendicular to the vehicle longitudinal direction.

8. The front vehicle-body structure of the vehicle of claim 5, wherein said front side frame further includes an intermediate part which is positioned in back of said compressive-deformation part and configured such that a shape of a cross section thereof perpendicular to the vehicle longitudinal direction changes from a roughly cross shape to a roughly rectangular shape as going rearward and a rear part which is positioned in back of said intermediate part and configured such that a shape of a cross section thereof perpendicular to the vehicle longitudinal direction is a roughly rectangular shape.

9. The front vehicle-body structure of the vehicle of claim 6, wherein said front side frame further includes an intermediate part which is positioned in back of said compressive-deformation part and configured such that a shape of a cross section thereof perpendicular to the vehicle longitudinal direction changes from a roughly cross shape to a roughly rectangular shape as going rearward and a rear part which is positioned in back of said intermediate part and configured such that a shape of a cross section thereof perpendicular to the vehicle longitudinal direction is a roughly rectangular shape.

10. The front vehicle-body structure of the vehicle of claim 7, wherein said front side frame further includes an intermediate part which is positioned in back of said compressive-deformation part and configured such that a shape of a cross section thereof perpendicular to the vehicle longitudinal direction changes from a roughly cross shape to a roughly rectangular shape as going rearward and a rear part which is positioned in back of said intermediate part and configured such that a shape of a cross section thereof perpendicular to the vehicle longitudinal direction is a roughly rectangular shape.

11. The front vehicle-body structure of the vehicle of claim 1, wherein said front side frame comprises an outer panel and an inner panel which forms the closed cross section together with said outer panel, said reinforcing member is provided with a joint flange portion to be joined to the front side frame, and a joint portion of said inner panel and said outer panel is integrally joined to said joint flange portion of the reinforcing member such that the joint flange portion is disposed between the inner panel and the outer panel.

12. The front vehicle-body structure of the vehicle of claim 2, wherein said front side frame comprises an outer panel and an inner panel which forms the closed cross section together with said outer panel, said reinforcing member is provided with a joint flange portion to be joined to the front side frame, and a joint portion of said inner panel and said outer panel is integrally joined to said joint flange portion of the reinforcing member such that the joint flange portion is disposed between the inner panel and the outer panel.

13. The front vehicle-body structure of the vehicle of claim 3, wherein said front side frame comprises an outer panel and an inner panel which forms the closed cross section together with said outer panel, said reinforcing member is provided with a joint flange portion to be joined to the front side frame, and a joint portion of said inner panel and said outer panel is integrally joined to said joint flange portion of the reinforcing member such that the joint flange portion is disposed between the inner panel and the outer panel.

14. The front vehicle-body structure of the vehicle of claim 5, wherein said front side frame comprises an outer panel and an inner panel which forms the closed cross section together with said outer panel, said reinforcing member is provided with a joint flange portion to be joined to the front side frame, and a joint portion of said inner panel and said outer panel is integrally joined to said joint flange portion of the reinforcing member such that the joint flange portion is disposed between the inner panel and the outer panel.

15. The front vehicle-body structure of the vehicle of claim 8, wherein said front side frame comprises an outer panel and an inner panel which forms the closed cross section together with said outer panel, said reinforcing member is provided with a joint flange portion to be joined to the front side frame, and a joint portion of said inner panel and said outer panel is integrally joined to said joint flange portion of the reinforcing member such that the joint flange portion is disposed between the inner panel and the outer panel.

16. The front vehicle-body structure of the vehicle of claim 11, wherein said inner panel of the front side frame is configured to have a hat-shaped open cross section opened outward, in a vehicle width direction, and said outer panel of the front side frame is configured in a plate shape such that the open cross section of the inner panel is closed with the outer panel, said reinforcing member comprises a body portion, an outer-side joint flange portion which is joined to an outward-side face portion, in the vehicle width direction, of the outer panel from a side of said closed cross section, and an inner-side joint flange portion which is joined to an inward-side face portion, in the vehicle width direction, of the inner panel from the side of the closed cross section, said outer-side joint flange portion and said inner-side joint flange portion are configured to protrude in the same direction, in the vehicle longitudinal direction, relative to said body portion, and said inner-side joint flange portion is provided to be offset, in the vehicle longitudinal direction, from said outer-side joint flange portion in a vehicle side view.

17. The front vehicle-body structure of the vehicle of claim 12, wherein said inner panel of the front side frame is configured to have a hat-shaped open cross section opened outward, in a vehicle width direction, and said outer panel of the front side frame is configured in a plate shape such that the open cross section of the inner panel is closed with the outer panel, said reinforcing member comprises a body portion, an outer-side joint flange portion which is joined to an outward-side face portion, in the vehicle width direction, of the outer panel from a side of said closed cross section, and an inner-side joint flange portion which is joined to an inward-side face portion, in the vehicle width direction, of the inner panel from the side of the closed cross section, said outer-side joint flange portion and said inner-side joint flange portion are configured to protrude in the same direction, in the vehicle longitudinal direction, relative to said body portion, and said inner-side joint flange portion is provided to be offset, in the vehicle longitudinal direction, from said outer-side joint flange portion in a vehicle side view.

18. The front vehicle-body structure of the vehicle of claim 13, wherein said inner panel of the front side frame is configured to have a hat-shaped open cross section opened outward, in a vehicle width direction, and said outer panel of the front side frame is configured in a plate shape such that the open cross section of the inner panel is closed with the outer panel, said reinforcing member comprises a body portion, an outer-side joint flange portion which is joined to an outward-side face portion, in the vehicle width direction, of the outer panel from a side of said closed cross section, and an inner-side joint flange portion which is joined to an inward-side face portion, in the vehicle width direction, of the inner panel from the side of the closed cross section, said outer-side joint flange portion and said inner-side joint flange portion are configured to protrude in the same direction, in the vehicle longitudinal direction, relative to said body portion, and said inner-side joint flange portion is provided to be offset, in the vehicle longitudinal direction, from said outer-side joint flange portion in a vehicle side view.

19. The front vehicle-body structure of the vehicle of claim 5, wherein a mount-reinforcing member is provided at said mount-bracket attachment part of the front side frame so as to reinforce the mount-bracket attachment part.

20. The front vehicle-body structure of the vehicle of claim 8, wherein a mount-reinforcing member is provided at said mount-bracket attachment part of the front side frame so as to reinforce the mount-bracket attachment part.

\* \* \* \* \*